Dec. 30, 1958 I. J. P. JAMES 2,866,847

SEQUENTIAL-TO-SIMULTANEOUS COLOR SIGNAL TRANSFORMATION SYSTEM

Filed Aug. 18, 1955 2 Sheets-Sheet 1

Inventor
I. J. P. James
By Glascock Downing & Seebold
Attys.

Dec. 30, 1958 I. J. P. JAMES 2,866,847

SEQUENTIAL-TO-SIMULTANEOUS COLOR SIGNAL TRANSFORMATION SYSTEM

Filed Aug. 18, 1955 2 Sheets-Sheet 2

Inventor
I. J. P. James
By Glascock Downing Seebold
Attys.

United States Patent Office 2,866,847

Patented Dec. 30, 1958

2,866,847

SEQUENTIAL-TO-SIMULTANEOUS COLOR SIGNAL TRANSFORMATION SYSTEM

Ivanhoe John Penfound James, South Ealing, London, England, assignor to Electric & Musical Industries Limited, Hayes, Middlesex, England, a company of Great Britain Application August 18, 1955, Serial No. 529,299

Claims priority, application Great Britain August 18, 1954

6 Claims. (Cl. 178—5.4)

Figure 1:
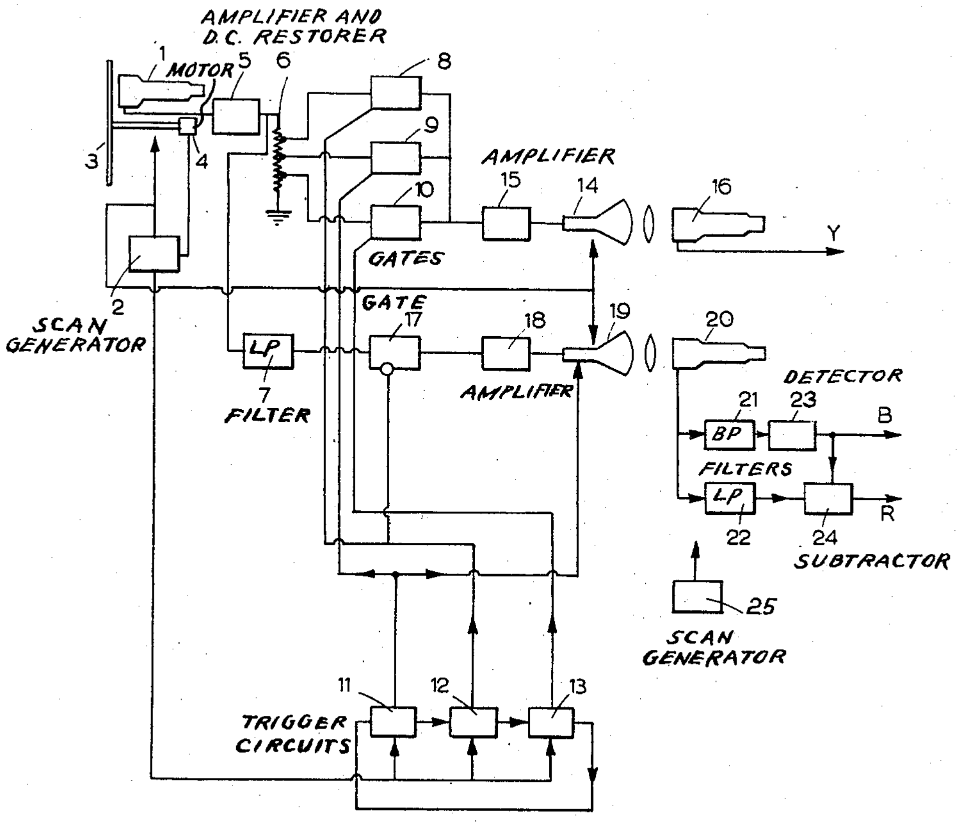

This invention relates to signal storage apparatus, and relates especially though not exclusively to apparatus for converting field sequential colour television signals into simultaneous colour television signals, and employing storage devices.

In the specification of co-pending patent application Serial No. 384,704, filed October 7, 1953, by I. J. P. James et al., there is described a method of converting field sequential colour television signals into simultaneous colour television signals. It was suggested in said application, in order to avoid the setting up of beat patterns caused by interaction between the raster on a display tube and the raster on a storage tube, that the scanning of the field sequential picture should be in the form of vertical lines instead of the normal horizontal lines and that after storage of the displayed image in the storage tube the latter be scanned in the normal manner in horizontal lines. In said specification one form of apparatus described for converting field sequential colour signals into simultaneous colour signals, comprises three display tubes and three storage tubes, the three display tubes being used to display green, red and blue information or one of said tubes being employed to display the so-called Y signal and the other two tubes the red and blue signals respectively.

One of the objects of the present invention is to provide an improved apparatus which as applied to a converting system as described in said co-pending application only requires two display and two storage tubes.

According to one aspect of the present invention there is provided apparatus for converting field sequential colour television signals into simultaneous colour television signals, comprising a charge storage electrode, means for applying signals to said electrode during a field of one colour so as to store charges in lines extending in one direction, means for applying signals to said electrode during fields of a different colour so as to store charges in lines extending in the same direction, means for varying the effective width of the lines during fields of one colour with respect to the width of the lines during fields of the different colour so as to cause merging of the lines during said first-mentioned fields and to cause the lines to remain discrete during said other fields, means for scanning said electrode in lines extending transverse to said first lines to reproduce signals representing said different colours, and frequency sensitive means for separating reproduced signals representing the different colours.

The invention takes advantage of the fact that when the lines in which the charges are stored are discrete, transverse scanning of these lines produces, in effect, a carrier wave modulated by signals corresponding to the stored charges. On the other hand, if the lines are widened so as to cause them to merge, the signals reproduced by scanning the lines in a transverse direction remain as video signals. It is therefore readily possible to separate signals representing different colours on a frequency basis so that signals of two colours, for example red and blue, can be stored on the one storage electrode during the conversion process.

Although the invention is especially applicable to apparatus for converting field sequential colour television into simultaneous colour television signals, the principle involved is nevertheless capable of wide application to storage devices in which input information is applied to a storage electrode and subsequently reproduced by scanning said storage electrode.

According to the present invention in this wider aspect there is provided signal storage apparatus comprising a charge storage electrode, means for applying signals to said electrode so as to store charges in lines extending in one direction, means for scanning said storage electrode in lines transverse to said first lines to reproduce the applied signals, and means for varying the effective width and/or separation of different groups of said first lines so that signals derived by scanning said electrode can be separated on a frequency basis.

The principle involved is also applicable to cases in which a storage electrode of a pick-up tube is exposed directly to a scene. In this case charges are stored corresponding to the scene without the production of a line structure but in order to enable signals representing different colours of a scene to be separated on a frequency basis, means may be provided for artificially producing a line structure during exposure of the pick-up tube to one colour component of the scene, but not during exposure of the pick-up tube to another colour component. Thus although the tube is exposed sequentially to different colour components, simultaneous colour signals which can be separated on a frequency basis, can be derived by scanning the storage electrode.

Figure 2:
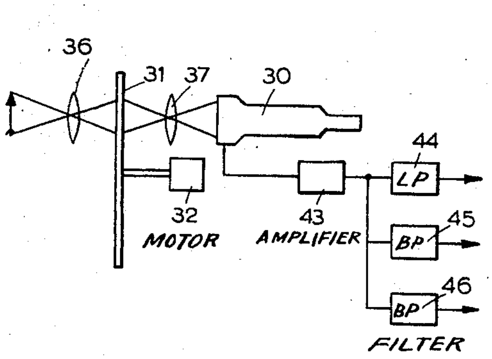
Figure 3:
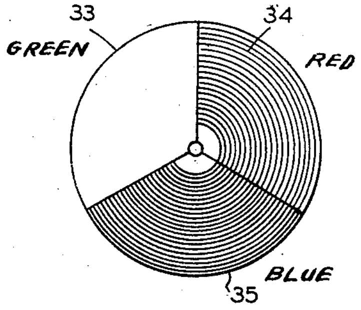
Figure 4:
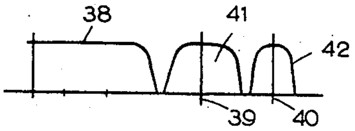

In order that the invention may be clearly understood and readily carried into effect, the invention will be more fully described with reference to the accompanying drawings, in which:

Figure 1 illustrates diagrammatically and mainly in block form one example of apparatus for converting field sequential colour television signals into simultaneous colour television signals according to the present invention, Figure 2 illustrates an application of the invention in which a single pick-up tube is exposed directly to a scene in such manner as to produce simultaneous color television signals, Figure 3 shows a detailed view of the colour filter disc used in Figure 2, and Figure 4 is a diagram explanatory of the operation of Figures 2 and 3.

Referring to the drawing, the apparatus shown comprises a pick-up tube 1 which constitutes the pick-up tube of a colour television camera. The tube 1 has a target electrode of the charge storage type and is preferably of the construction described in the Journal of the Institution of Electrical Engineers, volume 97, part III, No. 50, pages 383 et seq. The tube 1 has a scanning waveform generator represented in general by the rectangle 2 and it will be assumed that the generator is arranged to cause the tube 1 to operate at a rate of 150 fields per second, each field comprising, for example 202½ lines. A colour-filter disc 3 is mounted in front of the pick-up tube 1 and is rotated by a motor 4 during operation of the camera in synchronism with the scanning traversals in the pick-up tube so that in known manner the target of the pick-up tube is exposed sequentially during successive fields to the red, green and blue components of the scene being televised. The signal output of the tube 1 therefore comprises field sequential colour television signals occurring at the rate of 150 fields per second. These signals are applied to an amplifier and D. C. restoring circuit represented by the rectangle 5 and thence applied in parallel to an attenuator 6 and to a low pass filter 7 having a bandwidth of, say, 4.5 megacycles. The potentiometer attenuator 6 has three taps so arranged that the signals set up at the taps are in a predetermined ratio. The ratio may be 0.59 to 0.30 and 0.11 if the display tube 14 (referred to subsequently) has a linear characteristic. If its characteristic is non-linear it may be linearised by negative feedback, as described for example in co-pending United States patent application Serial No. 581,239, filed April 27, 1956, by E. W. Taylor. These taps on the attenuator 6 are connected as shown to the inputs of three normally closed gates 8, 9, 10.

The opening of the gates is controlled by a ring counter consisting of three trigger circuits 11, 12 and 13 which are coupled to form a closed ring in known manner and which receive pulses having a repetition frequency of 150 fields per second from the scanning generator 2. The ring counter may, for example, be of the construction described in co-pending patent application Serial No. 418,195, filed in the United States Patent Office on March 23, 1954, by E. L. C. White et al., and is so operated that the trigger circuits 11, 12 and 13 produce in succession pulses having a duration of $\frac{1}{150}$ of a second. Each such pulse from the trigger circuit 11 is applied to the gate 9 to open said gate for the duration of the pulse. Similarly, each pulse from the trigger circuit 12 is applied to the gate 8 and that from the trigger circuit 13 is applied to the gate 10. Signals passing through the gates are then transmitted to the modulator electrode of a display tube 14 through a drive amplifier 15 and it will be appreciated that signals are applied to the display tube 14 during fields of each colour but that the signals have their amplitudes adjusted by the potentiometer 6 in such a way that the green, red and blue signals are in the aforesaid ratio.

The tube 14 may be an image reproducing tube of normal construction which is scanned in synchronism with the pick-up tube 1 and the light images produced on the fluorescent screen of this tube are picked up by a pick-up tube 16 via a suitable lens system. The tube 16 may be of similar construction to the pick-up tube 1 but is scanned at the rate of 50 fields per second, the scanning waveform generator for the tube 16 being represented in general by the rectangle 25. It is arranged, however, that the scanning lines in the pick-up tube 1 and the display tube 14 are vertical and that the field deflections occur in the horizontal direction, as opposed to normal practice in which the scanning lines are horizontal and the field deflections are vertical. However, the scanning waveform generator 25 for the pick-up tube 16 is arranged to produce horizontal scanning lines in the pick-up tube 16 and to have the field deflections in the vertical direction as normally. The signals reproduced by the pick-up tube 16 are therefore suitable for employment as the Y signal of the N. T. S. C. colour system. By arranging that the scanning lines in the display tube 14 are vertical whilst those on the pick-up tube 16 are horizontal, the setting up of beat patterns caused by interaction between the raster of the display tube 14 and the raster on the pick-up tube 16 are substantially avoided. The output of the pick-up tube 16 may be passed through a low pass filter to remove dot patterning due to the cross-scanning if necessary.

The field sequential colour television signals transmitted through the aforesaid low pass filter 7 from the pick-up tube 1 are applied to a normally open gate 17 and thence via drive amplifier 18 to a second display tube 19 similar to the display tube 14. Thus, the display tube 19 has its scanning deflections controlled by the generator 2 so that the scanning lines in the tube 19 are vertical and field deflections occur in the horizontal direction. The gate 17 has an inhibiting connection from the trigger circuit 12 of the aforesaid ring counter and therefore the gate 17 is closed during the scanning of "green" fields by the pick-up tube 1. Therefore, only the signals generated during the red and blue fields of the pick-up tube 1 are applied to the display tube 19 and caused to produce light images on this tube. Furthermore, it is arranged that the scanning beam in the display tube 19 is defocussed during "red" fields to such an extent that the scanning lines which would otherwise be apparent on the fluorescent screen are caused to merge and thereby virtually eliminate the line structure. To achieve this result the tube 19 may, for example, be electrostatically focussed and in this case defocussing can be produced by applying a suitable potential during the "red" fields to the focussing electrode from the trigger circuit 11 in the ring counter. It is known that in trigger circuits of conventional construction, an output potential can be obtained at a variety or points which varies between two fixed values as the trigger circuit alternates between its two states of stability. It is therefore readily possible to connect the focussing electrode of the tube 19 to a point in the trigger circuit 11 such that the tube 19 is in a condition of sharp focus when the trigger circuit 11 is in its stable condition, that is during "green" and "blue" fields, and is defocussed when the trigger circuit is in its unstable condition, that is during "red" fields. The connection is shown by the line 19*a*. During the "blue" fields the focus of the tube is not disturbed and therefore scanning lines are sharply defined and remain discrete on the fluorescent screen. The light images formed on the screen of the tube 19 are projected on the target of the pick-up tube 20, which is similar to the pick-up tube 16 and which has its scanning deflections controlled by the same waveform generator 25. Signals applied to the display tube 19 during red fields are therefore stored on the target of the tube 20 in vertical lines of such width that the lines merge on the target electrode, whereas the signals applied to the display tube 19 during "blue" fields are stored on the target in lines extending in the same direction but which remain discrete. When the target of the pick-up tube 20 is scanned in the normal way, that is, in lines extending horizontally, the discrete lines in which the blue signals are stored serve, in effect, to produce a carrier wave which is modulated by the blue signals. On the other hand, since the lines in which the red signals are stored on the target are virtually merged together, signals derived from the pick-up tube 20 in response to the storage of red signals remain as video frequency signals, the red and blue signals being, of course, reproduced simultaneously except in so far as amplifiers introduce different time delays due to the different frequency bands involved. Such different time delays can be corrected in normal manner.

The signal output of the tube 20 is applied in parallel to a band pass filter 21 and to a low pass filter 22. The band pass filter 21 has a response characteristic such that it passes the aforesaid "carrier wave" and as many of the modulation frequency components of this wave as desired. The output of the band pass filter is then applied to a detector circuit 23 which removes the carrier wave, leaving the desired blue signals as video frequency signals. On the other hand, the low pass filter 22 has a response characteristic such that only red signals within a desired frequency band can pass through the filter and these signals are then passed to a subtracting circuit 24 in which there is subtracted from the red signals a fraction of the signal output of the detector 22, this fraction being adjusted so that any components in the output of the filter 22 due to blue signals is substantially eliminated. The resultant output of the circuit 24 consists only of red signals, whereas the output of the circuit 23 consists only of blue signals occurring simultaneously with the red signals and these red and blue signals can subsequently be employed to produce the aforesaid N. T. S. C. waveform, or other form of colour television signal waveform as desired. It will therefore be appreciated that by the use of transverse scanning in conjunction with the variation of the effective width of the lines during fields of one colour with respect to the width of the lines during fields of another colour, signals of two different colours can be displayed in a single display tube and stored on the storage electrode of a single pick-up tube, so avoiding the use of three display and three pick-up tubes as described in the aforementioned co-pending United States patent application Serial No. 384,704.

Instead of defocussing the beam in the display tube during the "red" fields in order to increase the effective widths of the lines and cause merging of the lines, the effective width of the lines can be increased by other means such as spot wobbling or spot broadening or by optical defocussing. A spot broadening circuit of the construction described in British patent specification No. 742,789 may for example be employed. The frequency of the carrier wave can be reduced, if desired, by blacking out alternate lines on the display tube during the "blue" field and in some cases pairs of lines during this field can be alternately excited and blacked out. The invention is not, of course, limited to the particular colour sequence referred to. For example, the display tube 14 may be arranged to display the green component of the scene being televised, a Y signal being produced by matrixing the outputs of the tubes 16 and 20. Alternatively the disc 3 may include a Y filter.

Moreover, the invention is not confined to use in such a way that one display tube and one pick-up tube can be eliminated in apparatus for converting field sequential colour television signals to simultaneous colour television signals. For example, the invention can be applied to measure and compensate for transmission or sensitivity variations in any converting arrangement employing a display tube such as 19 and a pick-up tube such as 20. For example, to correct for transmission variations in, say, the red channel of a signal converter, the red signal, after band limitation as described above, is displayed for 1/150 of a second on the display tube, with the beam defocussed. During one of the following colour fields, that is when green or blue signals are being displayed on other tubes, the first-mentioned display tube is scanned with a sharply focussed beam of constant intensity. Consequently, the output of the pick-up tube is a red video signal and a carrier waveform modulated by transmission variations introduced by the display tube, the pick-up tube, lens losses, and such like. In addition, there will be video frequency components due to the transmission variations superimposed on the red signals and these can be subtracted from the red video signals by the technique described above.

The red video signal and the modulated carrier wave are separated on a frequency basis and the carrier wave is then band limited and demodulated and the derived modulation frequency signals are used to operate a gain control circuit either in the channel leading to the respective display tube or in the output channel of the respective pick-up tube, so as to reduce variations in the red signals due to transmission variations.

Alternatively, the beam in a display tube may be defocussed during intervals when it is maintained at constant intensity and sharply focussed during the occurrence of red signals so that the red signals will be reproduced as modulation on a carrier wave, and the reference signal reproduced at low frequencies. Furthermore, the carrier frequencies produced can be lowered by blacking out some lines as previously mentioned. The signal-to-noise ratio of the signal used for correcting sensitivity variations can be improved by integration techniques as, for example, by storing the signals in a magnetic storage drum or in storage tubes with long lag or by a diode-condenser or ferro-magnetic matrix store.

The method described above of correcting for transmission variations can also be applied to the blue channel of a converter and alternative methods for controlling transmission variations in a Y or green channel can be used, if necessary.

The employment of the above described methods for correcting for transmission variations requires that the overall focus of the display tube, the lens and the pick-up tube should be good and it may be advantageous to vary the focus as a function of the beam deflection in known manner so as to maintain good focus. It may also be possible to cause the focus to vary cyclically at a high rate to such an extent that during each cycle of variation it is ensured that the beam of the display tube passes through a condition of precise focus. The signals derived from the pick-up tube 20 for sensitivity correction purposes can then be peak rectified, and the output of the peak rectifier used for correction purposes, said output, of course, corresponding to the condition of precise focus.

Instead of using separate display and pick-up tubes such as 19 and 20 the function of the two tubes can be combined in a single tube in which the input information is "written" on a storage electrode by one beam, and reproduced from the same storage electrode by another beam. Moreover, the invention as aforesaid can be applied to the separation, on a frequency basis, of any desired signals applied to a charge storage electrode.

In Figure 2, reference 30 indicates the single pick-up tube of a television camera which is similar to the tube 1 of Figure 1 but for which the scanning rate will be assumed to be 50 fields per second and the scanning lines horizontal. A colour-filter disc 31 is mounted in front of the pick-up tube as indicated and is driven by a motor 32 at a rate which is synchronous with the field scanning rate for the tube 30. As indicated in Figure 3 the disc 31 comprises three sector-shaped colour filters denoted by references 33, 34 and 35. The filter 33 is coloured green, the filter 34 is coloured red, and the filter 35 is coloured blue. Moreover, the filters 34 and 35 are divided into a large number of arcuate strips by means of thin opaque lines, the lines being more closely spaced in the filter 35 than in the filter 34. An image of the scene to be televised is focussed on the plane of the disc by an objective lens 36, and that colour component of the light image which is transmitted by the disc 31 is then focussed on the target pick-up tube 30 by means of the relay lens 37. Moreover, the rate of rotation of the disc 31 is so controlled that, having regard to the number of individual filters on the disc, the target of the pick-up tube 30 is exposed in succession to the red, green and blue components of the scene being televised during each 1/50 of a second. Thus, light is admitted to the target of the pick-up tube by filter 33 during each rotation of the disc for 1/150 of a second, and similarly for the red and blue filters.

In operation of the arrangement shown, the green component of a scene being televised is applied to the target of the tube 30 in such a way that no line structure is formed on the target. However, by virtue of the opaque lines on the filters 34 and 35 the red and blue components of the scene are applied to the target in such a way as to store charges in lines which are virtually vertical. Moreover, the number of lines is predetermined so that when the target is scanned in horizontal lines by the beam of the pick-up tube, signals representing the red and blue components of the scene can be separated from each other and from signals representing green components of the scene on a frequency basis.

This is illustrated in Figure 4 in which the curve 38 represents the frequency spectrum of the green signals derived by scanning in the pick-up tube 30. The vertical line 39 represents the frequency of the carrier wave which is produced by the opaque lines on the filter 34 and the vertical line 40 represents the frequency of the carrier wave produced by the opaque lines on the filter 35. Furthermore, the curve 41 represents the frequency spectrum produced by modulation of the carrier wave 39 by red signals, whilst the curve 42 represents the frequency spectrum produced by modulating the carrier wave 40 by blue signals. In order to limit the frequency spread of the modulation components produced by red and blue signals, so as to prevent substantial overlapping of the frequency spectra 38, 41 and 42, diffusing filters may be mounted in front of the red and blue filters 34 and 35 so as to reduce the definition of the corresponding signals derived by scanning the target of the pick-up tube 30. Alternatively, the image focussed on the disc 31 by the lens 36 may be defocussed slightly when the filters 34 and 35 are operative. The signals representing the different colour components of the scene can then be separated by the use of low pass and band pass filters in a manner similar to that described with reference to Figure 1. Thus, reference 43 represents the head amplifier and D. C. restoration circuit of the pick-up tube 30. Reference 44 represents a low pass filter for separating green signals from the red and blue signals and references 45 and 46 represent the band pass filters for separating the red and blue signals respectively. Cancellation of undesired blue signals appearing in the red channel, and similarly in the other channels, can be achieved by cancellation as described with reference to Figure 1.

It will be appreciated that the arrangement shown in Figures 2 and 3 enables simultaneous colour television signals to be produced using a single pick-up tube which is exposed sequentially to different colour components of the scene to be televised. Modifications may, of course, be made in the arrangement illustrated, for example, the filter 33 on the disc 31 may be a Y filter instead of a green filter and the disc 31 may be replaced by a loop of film having the required filters formed, in cyclic order, on successive frames of the film, the film being advanced in front of the pick-up tube 30 in a plane parallel to the target thereof.

What I claim is:

1. Apparatus for converting field sequential colour television signals into simultaneous colour television signals, comprising a charge storage electrode, means for applying signals to said electrode during a field of one colour so as to store charges in lines extending in one direction, means for applying signals to said electrode during fields of a different colour so as to store charges in lines extending in the same direction, means for varying the effective width of the lines during fields of one colour with respect to the width of the lines during fields of the different colour so as to cause merging of the lines during said first-mentioned fields and to cause the lines to remain discrete during said other fields, means for scanning said electrode in lines extending transverse to said first lines to reproduce signals representing said different colours, and frequency sensitive means for separating reproduced signals representing the different colours.

2. Apparatus according to claim 1, wherein said means for applying signals to said electrode comprises an image reproducing tube, means for applying signals to said tube during fields of said different colours to produce light images, and a pick-up tube including said charge storage electrode and arranged for exposure to said light images.

3. Apparatus according to claim 2, wherein said means for varying the effective width of said lines comprises means for varying the focus of the beam of said image reproducing tube.

4. Signal storage apparatus comprising a charge storage electrode, means for applying signals to said electrode so as to store charges in lines extending in one direction, means for scanning said storage electrode in lines transverse to said first lines to reproduce the applied signals, means for varying the effective separation of different groups of said first lines, and frequency sensitive means for separating reproduced signals stored in said different groups of lines.

5. Signal storage apparatus comprising a charge storage electrode, means for applying information to said electrode during spaced intervals to store charges in said electrode in lines extending in one direction, means for applying information to said electrode during intervening intervals to store charges on said electrode without a line structure, means for scanning said storage electrode in lines transverse to said first lines to derive signals representative of the applied information, and frequency sensitive means for separating said derived signals.

6. Signal storage apparatus according to claim 5 wherein said means for applying information to said charge storage electrode comprises a movable filter having spaced sections of lined structure, alternate lines being transparent and opaque to one colour component, and intervening sections wholly transparent to a different colour component, and comprising driving means to move said filter to cyclically dispose said spaced and intervening sections before said electrode.

References Cited in the file of this patent

UNITED STATES PATENTS

| | | |
|---|---|---|
| 2,545,957 | Kell | Mar. 20, 1951 |
| 2,705,258 | Lesti | Mar. 29, 1955 |
| 2,733,291 | Kell | Jan. 31, 1956 |

FOREIGN PATENTS

| | | |
|---|---|---|
| 928,783 | France | June 16, 1947 |